United States Patent
Ohta et al.

(10) Patent No.: US 11,472,425 B2
(45) Date of Patent: Oct. 18, 2022

(54) DISPLAY DEVICE FOR HYBRID VEHICLE

(71) Applicant: MITSUBISHI JIDOSHA KOGYO KABUSHIKI KAISHA, Tokyo (JP)

(72) Inventors: Jinichi Ohta, Tokyo (JP); Takayuki Okuji, Tokyo (JP); Yuichi Kamei, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 179 days.

(21) Appl. No.: 16/529,414

(22) Filed: Aug. 1, 2019

(65) Prior Publication Data

US 2020/0039532 A1 Feb. 6, 2020

(30) Foreign Application Priority Data

Aug. 2, 2018 (JP) .............................. JP2018-145583
Jul. 10, 2019 (JP) .............................. JP2019-128007

(51) Int. Cl.
*B60W 50/04* (2006.01)
*B60W 20/40* (2016.01)
(Continued)

(52) U.S. Cl.
CPC ..... *B60W 50/04* (2013.01); *B60W 2050/0095* (2013.01); *B60W 2050/146* (2013.01); *B60W 2510/244* (2013.01)

(58) Field of Classification Search
None
See application file for complete search history.

(56) References Cited

U.S. PATENT DOCUMENTS

2009/0125173 A1    5/2009 Komatsu et al.
2009/0243827 A1*  10/2009 Burke ................... B60K 35/00
                                                    340/439
(Continued)

FOREIGN PATENT DOCUMENTS

CN      101428613 A     5/2009
DE      102010020673 A1 * 11/2011   ............ B60W 50/14
(Continued)

OTHER PUBLICATIONS

"Volkswagen launches new Passat GTE plug-in hybrid in Europe," Jul. 14, 2015, Green Car Congress, <https://www.greencarcongress.com/2015/07/20150714-passatgte.html> (Year: 2015).*
(Continued)

*Primary Examiner* — Aniss Chad
*Assistant Examiner* — Madison R Hughes
(74) *Attorney, Agent, or Firm* — Birch, Stewart, Kolasch & Birch, LLP (57) ABSTRACT

A display device for displaying at least one of outputs related to traveling of a hybrid vehicle includes a first area that indicates a first output in a first mode and indicates a second output in a second mode, a second area provided side by side with the first area and that indicates a third output in the second mode, and a third area provided in a position adjacent to the second area, and that indicates a range of the first output where a possibility that the internal combustion engine starts is high. The first area has a first display portion that changes according to the first output in the first mode and the second output in the second mode. The second area has a second display portion that changes according to the third output in the second mode.

15 Claims, 3 Drawing Sheets

(51) Int. Cl.
*B60K 37/02* (2006.01)
*B60K 35/00* (2006.01)
 *B60W 50/00* (2006.01)
 *B60W 50/14* (2020.01)

(56) References Cited

U.S. PATENT DOCUMENTS

| | | |
|---|---|---|
| 2009/0322503 A1 | 12/2009 | Suzuki et al. |
| 2014/0138172 A1 | 5/2014 | Suzuki et al. |
| 2014/0182509 A1* | 7/2014 | Hackenberg ........... B60K 35/00 116/28 R |
| 2016/0318502 A1 | 11/2016 | Suzuki et al. |
| 2018/0079306 A1* | 3/2018 | Kim ....................... B60K 35/00 |

FOREIGN PATENT DOCUMENTS

| | | |
|---|---|---|
| JP | 4155321 B2 | 9/2008 |
| WO | WO 2020/195019 A1 | 10/2020 |

OTHER PUBLICATIONS

Extended European Search Report dated Dec. 13, 2019 in the corresponding European Patent Application 19189551.5.
Extended European Search Report dated Nov. 24, 2020 in corresponding European Application No. 20185676.2.
Chinese Office Action for corresponding Chinese Application No. 201910699323.7, dated May 31, 2022 with English translation.

* cited by examiner

DISPLAY DEVICE FOR HYBRID VEHICLE

CROSS REFERENCE TO RELATED APPLICATIONS

This application is based on Japanese Patent Application (No. 2018-145583) filed on Aug. 2, 2018 and Japanese Patent Application (No. 2019-128007) filed on Jul. 10, 2019, the contents of which are incorporated herein by reference.

BACKGROUND OF THE INVENTION

1. Field of the Invention

The present invention relates to a display device for a hybrid vehicle having a motor and an engine.

2. Description of the Related Art

A hybrid vehicle has a motor and an engine as driving sources for traveling, and as traveling modes thereof, has an EV (electric vehicle) mode in which the driving wheels are driven only by the motor and an HV (hybrid vehicle) mode in which the driving wheels are driven by the motor and the engine.

The hybrid vehicle travels in the EV mode when starting, and thereafter, according to the state of the vehicle, starts the engine and travels in the HV mode. The display device of such hybrid vehicle indicates to the driver whether the vehicle is currently traveling in the EV mode or in the HV mode (for example, see JP-B-4155321).

For example, JP-B-4155321 describes a vehicle provided with a first display portion displaying the state quantity that changes according to an output request from the driver and a second display portion displaying a dividing line indicating that the traveling mode is switched at this state quantity.

However, since the above-mentioned dividing line changes according to the state of the vehicle and sometimes moves irrespective of the driver's driving operation, not only it is difficult for the driver to judge the traveling state of the hybrid vehicle but also start of the engine (shift from the EV mode to the HV mode) at an unexpected timing and the like can occur.

SUMMARY OF INVENTION

There is provided a display device for a hybrid vehicle of a first aspect configured to display at least one of outputs related to traveling of the hybrid vehicle, the display device including:
 a first area configured to indicate a first output in a first mode in which traveling is performed with an electric motor while an internal combustion engine is stopped and to indicate a second output in a second mode in which traveling is performed with the internal combustion engine and the electric motor both being actuated;
 a second area provided side by side with the first area and configured to indicate a third output in the second mode; and
 a third area provided in a position adjacent to the second area, included in the first area, and configured to indicate a range of the first output where a possibility that the internal combustion engine starts is high,
 wherein the first area has a first display portion that changes according to the first output in the first mode and the second output in the second mode; and
 wherein the second area has a second display portion that changes according to the third output in the second mode.

DESCRIPTION OF EMBODIMENTS

The present invention is made in view of the above-mentioned problem, and an object thereof is to make the traveling state of the hybrid vehicle easy-to-understand. First, embodiments of this disclosure to achieve the objection are summarized as follows.

There is provided a display device for a hybrid vehicle of a first aspect configured to display at least one of outputs related to traveling of the hybrid vehicle, the display device including:
 a first area configured to indicate a first output in a first mode in which traveling is performed with an electric motor while an internal combustion engine is stopped and to indicate a second output in a second mode in which traveling is performed with the internal combustion engine and the electric motor both being actuated;
 a second area provided side by side with the first area and configured to indicate a third output in the second mode; and
 a third area provided in a position adjacent to the second area, included in the first area, and configured to indicate a range of the first output where a possibility that the internal combustion engine starts is high,
 wherein the first area has a first display portion that changes according to the first output in the first mode and the second output in the second mode; and
 wherein the second area has a second display portion that changes according to the third output in the second mode.

In a display device of a second aspect according to the first aspect,
 the first display portion and the second display portion are provided respectively; and
 in the first mode, the second display portion is fixed at a starting point of the second area.

For example, a starting point of the second area is positioned on a boundary line between the first area and the second area. In other words, the starting point of the second area is positioned on 12 o'clock in the display device (12 o'clock is equal to the position of 0 degree).

In a display device of a third aspect according to the first aspect or the second aspect,
 a sectioning line indicating a starting point of the third area is provided in the first area; and
 the sectioning line is non-displayed in the second mode.

In a display device of a fourth aspect according to the third aspect,
 the sectioning line becomes non-displayed in response to a shift from the first mode to the second mode.

In a display device of a fifth aspect according to any one of the first aspect to the fourth aspect,
the first mode and the second mode are shown in same display forms.

In a display device of a sixth aspect according to any one of the first aspect to the fourth aspect,
the first display portion and the second display portion are shown in different display forms.

In a display device of a seventh aspect according to any one of the first aspect to the sixth aspect,
the first display portion is an image of a belt-like figure.

In a display device of a eighth aspect according to any one of the first aspect to the sixth aspect,
the second display portion is a needle.

In a display device of a ninth aspect according to any one of the first aspect to the eighth aspect,
the first output and the second output indicate the same output parameter.

In a display device of a tenth aspect according to any one of the first aspect to the ninth aspect,
the second output indicates an output of the electric motor or an output of a battery connected to the electric motor; and
the first display portion changes according to the output of the electric motor or the output of the battery connected to the electric motor in the second mode.

In a display device of an eleventh aspect according to any one of the first aspect to the tenth aspect,
a display area formed of the first area and the second area is shaped in a circle; and
the first area and the second area are provided so as to range with each other in a fan-like or arc-like shape with an uppermost position of the display area as a boundary.

In a display device of a twelfth aspect according to any one of the first aspect to the eleventh aspect,
the second area indicates an engine speed of the internal combustion engine; and
the second display portion changes according to the engine speed of the internal combustion engine.

In a display device of a thirteenth aspect according to any one of the fifth aspect, the ninth aspect, the tenth aspect, the eleventh aspect and the twelfth aspect, the first display portion and the second display portion are needles.

In a display device according to a ninth aspect which display device solves the above-mentioned problem, in the display device according to any one of the first to eighth aspects of the invention, the second area indicates an engine speed of the internal combustion engine, and the second display portion changes according to the engine speed of the internal combustion engine.

According to the display device according to the first aspect, since the first display portion that changes according to the first output in the first mode or the second output in the second mode is displayed in the first area including the third area and the second display portion that changes according to the third output in the second mode is displayed in the second area, the driver can easily judge the traveling state of the hybrid vehicle by grasping which of the first display portion and the second display portion is changed.

According to the display device according to the second aspect, since the first display portion and the second display portion are provided respectively and in the first mode, the second display portion is fixed at a starting point of the second area, the driver can easily grasp a movement or change of the first display portion and also can easily judge the traveling state of the hybrid vehicle.

According to the display device according to the third and fourth aspects, by making the sectioning line (the third area) in the second mode non-displayed, the change of the display in the first area in the second mode becomes conspicuous, so that the driver can easily judge the traveling state of the hybrid vehicle, in particular, that the hybrid vehicle is traveling in the second mode. Moreover, by displaying the sectioning line (the third area) in the first traveling mode, the driver can be notified that the engine is in a state of readily starting.

According to the display device according to the fifth aspect and the thirteenth aspect, since the first mode and the second mode are shown in same display forms, when both of the first mode and the second mode in the second mode are operated, the same display forms are moved together, the visibility of the first display portion and the second display portion are improved and the designability and appearance of them are increased.

According to the display device according to the sixth aspect, since the first display portion and the second display portion are shown in different display forms, the driver can clearly distinguish the display portions from each other, so that the traveling state of the hybrid vehicle can be more easily judged.

According to the display device according to the seventh aspect, since the first display portion is an image of a belt-like figure, when the hybrid vehicle travels without the engine being started in the first mode, the driver can be more clearly notified of that state, so that viewability is improved.

According to the display device according to the eighth aspect, since the second display portion is a needle, when the traveling in the second mode is started, the traveling in the second mode can be more clearly notified to the driver by a dynamic movement of the needle.

According to the display device according to the ninth aspect, by displaying the first display portion with the same output parameter in the first mode and in the second mode, control can be simplified.

According to the display device according to the tenth aspect, by displaying the first display portion with the output of the electric motor or the output of the battery in the second mode, the driver can obtain information on the assist output of the electric motor as appropriate information conforming to the traveling state of the hybrid vehicle, more specifically, can check the excess outputs of the electric motor and the battery.

According to the display device according to the eleventh aspect, since the first area and the second area are disposed so as to range with each other with the uppermost portion of the display area as the boundary, it becomes easy for the driver to intuitively grasp the display information of the display device (the operation state of the hybrid vehicle).

According to the display device according to the twelfth aspect, by displaying the second display portion with the engine speed of the internal combustion engine, for example, even when the engine is actuated by the warm air of the catalyst or the like, the driver can easily grasp such actuation of the engine (for a purpose other than traveling).

Hereinafter, an embodiment of the display device according to the present invention will be described in detail with reference to the attached drawings. Needless to say, the present invention is not limited to the following embodiment and may be variously modified without departing from the gist of the invention.

First Embodiment

The structure of a display device according to a first embodiment of the present invention will be described with reference to FIG. 1 and FIGS. 2A to 2C.

Figure 1:
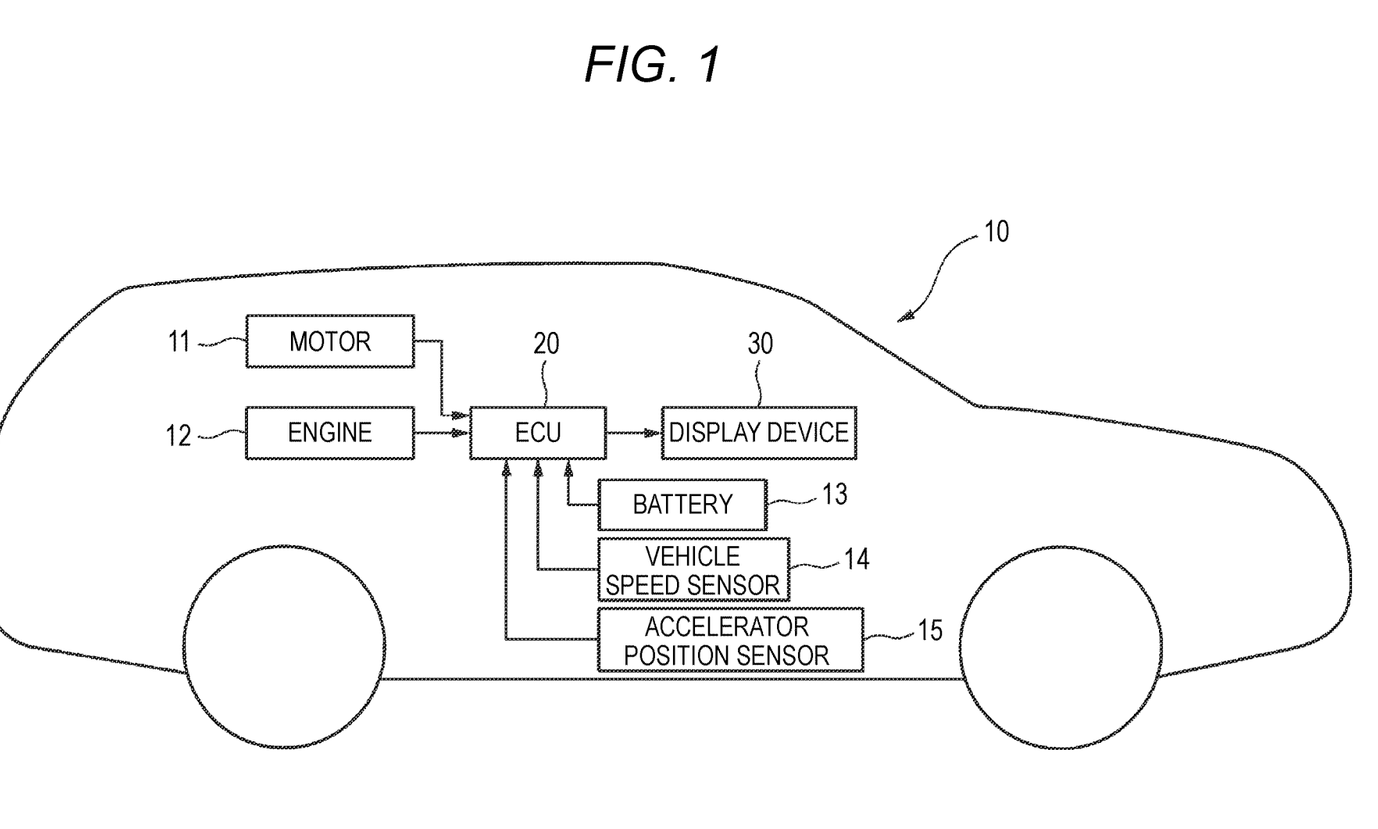
FIG. 1 is a block diagram explaining a hybrid vehicle.

As shown in FIG. 1, a hybrid vehicle 10 has a motor 11 (electric motor) and an engine 12 (internal combustion engine) as driving sources for traveling. The motor 11 may have a structure of driving the front wheels or the rear wheels. Also a structure may be adopted that the front wheels and the rear wheels are driven by a plurality of motors 11, respectively. Moreover, the engine 12 may also have the structure of driving the front wheels or the rear wheels or may have the structure of driving both of the front wheels and the rear wheels. Moreover, the hybrid vehicle 10 may have a generator (not shown) that is driven by the engine 12 to generate power.

As traveling modes, the hybrid vehicle 10 has a first mode (electric motor output mode) in which traveling using the motor 11 with the engine 12 being stopped (driving of the driving wheels) takes precedence (traveling by the motor 11 takes precedence over traveling by the engine 12) and a second mode (internal combustion engine output mode) in which the engine 12 is actuated and the hybrid vehicle 10 travels (the driving wheels are driven) by using, for example, the motor 11 and the engine 12.

Moreover, the hybrid vehicle 10 has an ECU (Electronics Control Unit) 20 as the control portion. The ECU 20 has a CPU (Central Processing Unit), a RAM (Random Access Memory), a ROM (Read Only Memory), an input/output circuit and the like, is electrically connected to the motor 11 and the engine 12, and is electrically connected also to a battery 13 that supplies power to the motor 11, a vehicle speed sensor 14 that detects the vehicle speed and an accelerator position sensor 15 that detects the accelerator position.

Therefore, to the ECU 20, a signal value from the motor 11 (the motor rotation speed, etc.) and a signal value from the engine 12 (ON/OFF, the engine rotation speed, etc.) are inputted, and further, a signal value from the battery 13 (SOC [state of charge], the battery output, etc.), signal values of the vehicle speed sensor 14 and the accelerator position sensor 15 and the like are also inputted.

The hybrid vehicle 10 further has a display device 30 that displays at least one of outputs related to the traveling of the hybrid vehicle 10 (traveling output), and the display device 30A is electrically connected to the ECU 20. The traveling output of the hybrid vehicle 10 is obtained by arithmetic processing being performed at the ECU 20 based on the above-mentioned signal value, and this arithmetically processed value (traveling output) is inputted to the display device 30A.

Figure 2A:
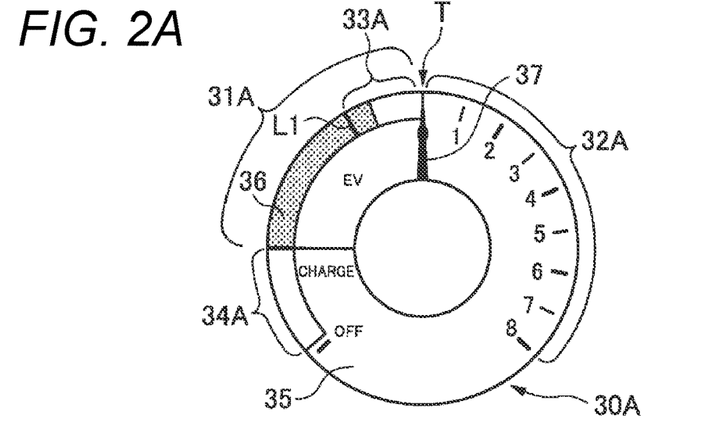
FIG. 2A is an explanatory view showing an example of an embodiment of a display device for a hybrid vehicle according to the present invention.
Figure 2B:
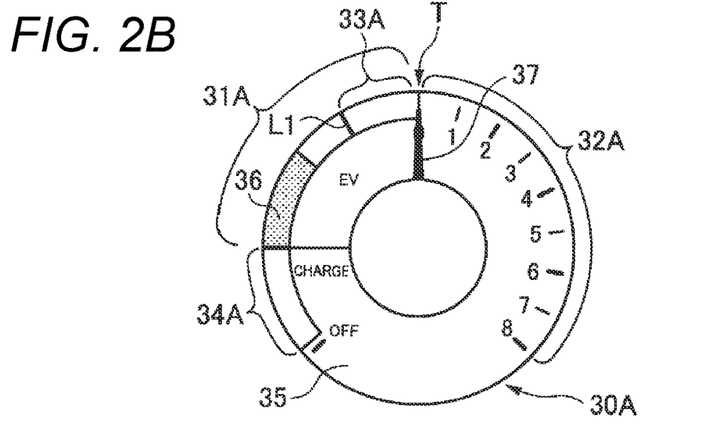
FIG. 2B is an explanatory view showing an example of the embodiment of the display device for a hybrid vehicle according to the present invention.
Figure 2C:
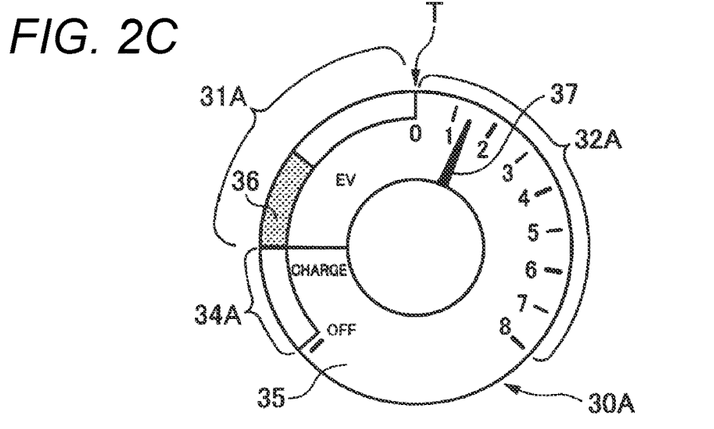
FIG. 2C is an explanatory view showing an example of the embodiment of the display device for a hybrid vehicle according to the present invention.

As shown in FIGS. 2A to 2C, the display device 20 is a display device 30A that has a circular instrument board 35 where a first area 31A (including a third area 33A), a second area 32A and a fourth area 34A are disposed. In the following description, as the expression of the direction on the instrument board 35, one or both of the following are used: the time of a clock with the uppermost position of the instrument board 35 as the position of 0 o'clock (=12 o'clock); and an angle when the uppermost position T of the instrument board 35 is the position of 0 degrees (=360 degrees).

The first area 31A is an area indicating the traveling output (first output) at the time of traveling using the motor 11 while the engine 12 is stopped, that is, in the first mode. The first area 31A is disposed in a fan-like or arc-like shape between the positions of approximately 270 degrees and 360 degrees (between the positions of approximately 9 o'clock and 12 O'clock in a hypothetical dial plate) on the outer periphery on the instrument board 35. In the first area 31A, a first display portion 36 that changes according to the traveling output in the first mode is displayed.

The first display portion 36 is an image of a belt-like figure indicating the value corresponding to the traveling output (first output) in the first mode in the first area 31A (between the positions of 9 o'clock and 12 o'clock). Specifically, the length (the length from the position of 9 o'clock) of the belt-like figure of the first display portion 36 changes according to the traveling output (first output) in the first mode, and the value corresponding to the traveling output (first output) in the first mode is indicated by the length of the belt-like figure (the position of the ending point [end portion] with the position of 9 o'clock as the starting point).

By the first display portion 36 being the image of the belt-like figure as described above, when the hybrid vehicle 10 travels without the engine 12 being started in the first mode, the driver can be more clearly notified of the traveling state of the vehicle and the start/stop condition of the engine, so that viewability is improved. The first display portion 36 is not limited to the image of the belt-like figure, and may be, for example, as illustrated in FIG. 3, a needle similar to a second display portion 37 described later.

Figure 3:
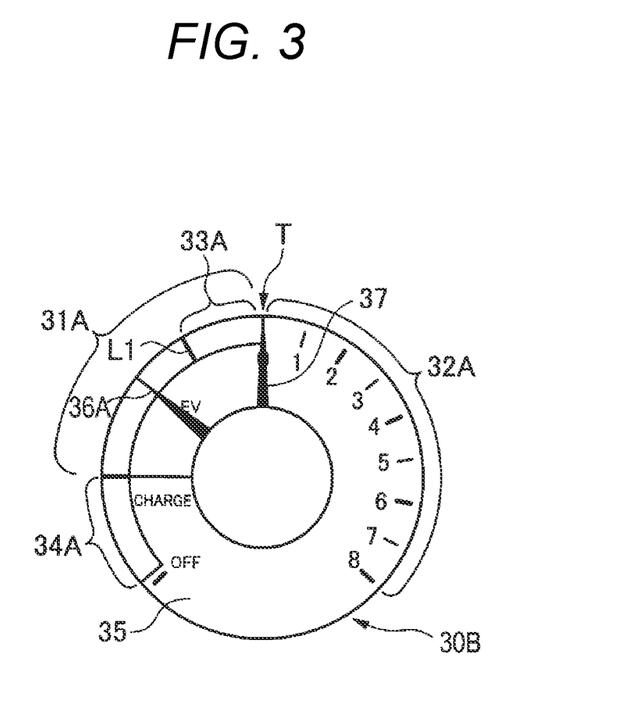
FIG. 3 is an explanatory view showing another example of the embodiment of the display device for a hybrid vehicle according to the present invention.

FIG. 3 is an explanatory view showing another example of the embodiment of the display device for a hybrid vehicle according to the present invention. Configuration elements of a display device 30B in FIG. 3 are same as those of the display device 30A in FIGS. 2A to 2C without a first display portion 36A in FIG. 3. In FIG. 3, if the configuration elements are same as the configuration elements in FIGS. 2A to 2C, same reference numbers of the configuration elements of FIGS. 2A to 2C are added to the configuration elements in FIG. 3 and their explanations are omitted.

The first display portion 36A is a needle pointing the value corresponding to the traveling output (first output) in the first mode in the first area 31A (between the positions of 9 o'clock and 12 o'clock). Specifically, the angle (an rotation angle from the position of 9 o'clock) of the needle of the first display portion 36A changes according to the traveling output (first output) in the first mode, and the value corresponding to the traveling output (first output) in the first mode is indicated by the pointing direction (a clockwise rotation angle from the position of 9 o'clock as the starting point).

Since the first display portion 36A and a second display portion 37 described hereinafter are needles respectively, that means, the first display portion and the second display portion are shown in same display forms, when both of the first display portion and the second display portion respectively change (move) in the second mode, the same display forms of the first display portion and the second display portion move together. Therefore, the visibility of the first display portion and the second display portion are improved and the designability and appearance of them are increased.

As the traveling output (first output) in the first mode, for example, an output parameter such as the battery output of the battery 13 may be used.

Moreover, in the first area 31A, the third area 33A is provided. The third area 33A is provided in a position adjacent to the second area (32A) in the first area (31A). In the first area 31A, a sectioning line (boundary) L1 representative of the starting point of the third area 33A is provided. The sectioning line L1 is a display indicating the position of the limit of the state where traveling using the motor 11 with the engine 12 being stopped takes precedence in the first mode (the value corresponding to the traveling output).

The state where traveling using the motor 11 with the engine 12 being stopped takes precedence is a state where none of a plurality of conditions to start the engine 12 holds. On the other hand, the state where there is a possibility (the possibility is high) that the engine 12 starts is a state where at least one of the conditions to start the engine 12 holds. The sectioning line L1 indicates the boundary between these states, that is, the limit area of the state where traveling using the motor 11 with the engine 12 being stopped takes precedence. Depending on the condition, there are cases where the engine 12 starts at a position in the counterclockwise direction with reference to the sectioning line L1 (in the first area 31A).

That is, the third area 33A included in the first area 31A is an engine start imminent area indicating the traveling output when at least one of the conditions to start the engine 12 holds to increase the possibility that the engine 12 starts, that is, when there is a possibility (the possibility is high) that shift is made from the first mode to the second mode. Moreover, the third area 33A is disposed in a fan-like or arc-like shape between the position of the sectioning line L1 and the position of 0 degrees (0 o'clock) (a position adjacent to the second area 32A) in the first area 31A.

Therefore, in the first mode, when there is no possibility (the possibility is low) that the engine 12 starts, the first display portion 36 changes within the range of the area except the third area 33A in the first area 31A, whereas when there is a possibility (the possibility is high) that the engine 12 starts, that is, immediately before the start of the engine 12, the first display portion 36 changes within the range of the third area 33A in the first area 31A.

Since the possibility of the engine 12 starting can be indicated by the first display portion 36 by providing such a third area 33A in the first area 31A, the driver can be notified that the engine 12 is in a state of readily starting. Therefore, it becomes easy for the driver to recognize the traveling state of the hybrid vehicle 10 and the operation state of the motor 11, grasp the traveling output and realize intended driving.

Moreover, the first area 31A may include an area indicating the output of the motor 11 (motor output) at the time of traveling with the engine 12 being actuated, that is, in the second mode. At this time, the sectioning line L1 is non-displayed, and the first display portion 36 indicates the value corresponding to the motor output (second output) in the first area 31A (between the positions of 9 o'clock and 12 o'clock). Specifically, the length (the length from the position of 9 o'clock) of the belt-like figure of the first display portion 36 changes according to the motor output (second output), and the value corresponding to the motor output (second output) is indicated by the length of the belt-like figure (the position of the ending point [end portion] with the position of 9 o'clock as the starting point).

The motor output (second output) is an output by the actuation of the motor 11, and as this motor output (second output), output parameters such as the rotation speed of the motor 11, the motive power (power) by the actuation of the motor 11 and the battery output of the battery 13 (the assist electric power of the motor 11) may be used.

By making the sectioning line L1 in the second mode non-displayed as described above, the change of the display in the first area 31A becomes conspicuous when shift is made from the first mode to the second mode, so that the driver can easily judge the traveling state of the hybrid vehicle 10, in particular, that the hybrid vehicle 10 is traveling in the second mode.

A structure may be adopted in which the traveling output (first output) in the first mode and the motor output (second output) in the second mode are selectable by the driver. For example, a selection switch (not shown) is provided on the display device 30A, and by operating this selection switch, one output parameter is selected from among the above-mentioned output parameters as each of the traveling output (first output) in the first mode and the motor output (second output) in the second mode. In a case where the first display portion 36 is made to change according to the same output parameter in the first mode and in the second mode, control can be simplified.

Moreover, in a case where the first area 31A indicates the output of the motor 11 or the output of the battery 13 in the second mode and the first display portion 36 changes according to the output of the motor 11 or the output of the battery 13 in the second mode, the driver can obtain information on the assist output of the motor 11 as appropriate information conforming to the traveling state of the hybrid vehicle 10, more specifically, can check the excess outputs of the motor 11 and the battery 13.

The second area 32A is an area indicating the traveling output (third output) at the time of traveling with the engine 12 being actuated, that is, in the second mode, and is disposed in a fan-like or arc-like shape between the positions of 0 degrees and approximately 135 degrees on the outer periphery on the instrument board 35. In the second area 32A, a second display portion 37 that is separately provided from the first display portion 36 and that changes according to the traveling output (third output) in the second mode is displayed.

The second display portion 37 is a needle pointing the value corresponding to the engine output in the second area 32A (between the positions of 0 degrees and approximately 135 degrees). Specifically, the pointing direction (the rotation angle from the direction of 0 o'clock [0 degrees] with the substantial center of the instrument board 35 as the base point) of the second display portion 37 changes according to the traveling output (third output) in the second mode, and the value corresponding to the traveling output (third output) in the second mode is pointed by the pointing direction (direction with the substantial center of the instrument board 35 as the base point).

By making the second display portion 37 the needle as described above, when the traveling in the second mode is started, the traveling in the second mode can be more clearly notified to the driver by a dynamic movement of the needle.

As the traveling output (third output) in the second mode, output parameters such as the rotation speed of the engine 12 and the motive power (power) by the actuation of the engine 12 may be used.

A structure may be adopted in which the traveling output (third output) in the second mode is selectable by the driver. For example, a selection switch (not shown) is provided on the display device 30A, and by operating this selection switch, one output parameter is selected from among the above-mentioned output parameters as the traveling output (third output) in the second mode.

In a case where the second display portion 37 is displayed by the rotation speed of the engine 11, for example, even when the engine 11 is actuated by the warm air of the catalyst or the like, the driver can easily grasp such actuation of the engine 11 (for a purpose other than traveling).

The fourth area 34A is an area indicating the charging output of the battery 13 by regenerative energy, and is disposed in a fan-like or arc-like shape between the positions of approximately 225 degrees and 270 degrees on the outer periphery on the instrument board 35. In the fourth area 34A, a regenerative energy display portion (not shown) that changes according to the power generation output of the motor 11 by regenerative energy is displayed.

The regenerative energy display portion (not shown) is an image of a belt-like figure indicating the value corresponding to the power generation output of the motor 11 by regenerative energy in the fourth area 34A (between the positions of approximately 225 degrees and 270 degrees). Specifically, the length (the length from the position of 270 degrees) of the belt-like figure of the regenerative energy display portion (not shown) changes according to the power generation output of the motor 11 by regenerative energy, and the value corresponding to the power generation output of the motor 11 by regenerative energy is indicated by the length of the belt-like figure (the position of the ending point [end portion] with the position of 270 degrees as the starting point).

On the above-described instrument board 35, in the first area 31A (including the third area 33A) and the fourth area 34A, no scale numerals are provided, and in the second area 32A, scale numerals are provided. Needless to say, scale numerals may be provided in the first area 31A (including the third area 33A) and the fourth area 34A, and scale numerals may be not provided in the second area 32A.

Moreover, on the above-described instrument board 35, the first display portion 36 and the regenerative energy display portion (not shown) are images of belt-like figures, and the second display portion 37 is a needle of an analog meter. Needless to say, the first display portion 36 and the regenerative energy display portion (not shown) may be needles, and the second display portion 37 may be an image of a belt-like figure. At this time, it is preferable that the first display portion 36 and the second display portion 37 be shown in display forms different from each other. The different display forms may be any that enable the driver to clearly distinguish the display portions from each other, and are not limited to the image of the belt-like figure and the needle described above.

Moreover, the above-described first area 31A (including the third area 33A), second area 32A and fourth area 34A are disposed in fan-like or arc-like shapes in predetermined ranges, respectively, are independently disposed in similar fan-like or arc-like shapes in the predetermined ranges, and are also disposed in a fan-like or arc-like shape as a whole. The first area 31A (including the third area 33A) and the second area 32A are provided so as to range with each other in an arc-shape with the position of 12 o'clock as the boundary.

By making circular the display area formed of the first area 31A and the second area 32A and providing the first area 31A and the second area 32A so as to range with each other in a fan-like or arc-like shape with the uppermost position T of the display area (the instrument board 35) as the boundary as described above, it becomes easy for the driver to intuitively grasp the display information of the display device 30A (the operation state of the hybrid vehicle 10).

The operation of the display device according to the first embodiment of the present invention will be described with reference to FIGS. 1 and 2A to 2C.

When the driver starts the hybrid vehicle 10, the hybrid vehicle 10 starts to travel in the first mode.

At this time, on the instrument board 35 of the display device 30A, the first display portion 36 and the sectioning line L1 are displayed in the first area 31A, and the first display portion 36 changes within the range of the first area 31A according to the traveling output (first output) in the first mode (see FIGS. 2A and 2B). In the first mode, the engine 12 is not started, and the second display portion 37 is not swung in the second area 32A (indicates the scale "0").

The first display portion 36 and the sectioning line L1 are displayed by a predetermined output parameter or an arbitrary output parameter (for example, the engine start imminence) selected by a non-illustrated selection switch as the travelling output (first output) in the first mode.

Therefore, the driver can easily recognize that the hybrid vehicle 10 is traveling in the first mode (the traveling state of the hybrid vehicle 10) because the second display portion 37 is not swung in the second area 32A (indicates the scale "0") on the instrument board 35 of the display device 30A.

Moreover, the sectioning line L1 (the third area 33A) being displayed on the instrument board 35 of the display device 30A also enables the driver to easily recognize that the hybrid vehicle 10 is traveling in the first mode (the traveling state of the hybrid vehicle 10).

While the traveling output in the first mode is a traveling output (first output) not exceeding the sectioning line L1, that is, a traveling output with no possibility that the engine 12 starts, the first display portion 36 changes within the range of the area except the third area 33A in the first area 31A according to the traveling output (first output) in the first mode.

Therefore, from the display of the first display portion 36 and the sectioning line L1 in the first area 31A (the first display portion 36 changing in the range of the area except the third area 33A in the first area 31A), the driver easily recognizes that traveling in the first mode is possible, and can continue traveling in the first mode with security.

On the other hand, when the traveling output (first output) in the first mode becomes a traveling output exceeding the sectioning line L1, that is, a traveling output with the possibility that the engine 12 starts, the first display portion 36 changes within the range of the third area 33A in the first area 31A according to the traveling output in the first mode until the engine 12 starts (see FIG. 2B).

Therefore, since the hybrid vehicle 10 can be operated with the positional relationship between the first display portion 36 and the sectioning line L1 (the third area 33A in the first area 31A) being grasped, for example, when not wanting to start the engine 12, the driver can perform an operation to return the first display portion 36 into the range of the area except the third area 33A in the first area 31A by operating the accelerator position or the like.

Then, when the traveling output (first output) in the first mode exceeds, for example, the maximum output of the battery 13, the engine 12 starts, and the hybrid vehicle 10 starts to travel in the second mode.

At this time, on the instrument board 35 of the display device 30A, the second display portion 37 swings (is displayed/is moved) from the scale "0" in the second area 32A, and the second display portion 37 changes within the range of the second area 32A according to the traveling output (third output) in the second mode (see FIG. 2C).

The second display portion 37 is displayed by a predetermined output parameter or an arbitrary output parameter selected by a non-illustrated selection switch (for example, the rotation speed of the engine 12) as the traveling output (third output) in the second mode, and the first display portion 36 is displayed by a predetermined output parameter or an arbitrary output parameter selected by a non-illustrated selection switch (for example, the rotation speed of the motor 11) as the motor output (second output) in the second mode. The sectioning line L1 is non-displayed.

Therefore, the driver can easily recognize that the hybrid vehicle 10 shifts from the first mode to the second mode by a dynamic movement of the second display portion 37 at the time of the start of traveling in the second mode on the instrument board 35 of the display device 30A, and can easily recognize that the hybrid vehicle 10 is traveling in the second mode (the traveling state of the hybrid vehicle 10) because the second display portion 37 is swung in the second area 32A (indicates a scale other than "0").

Moreover, since the sectioning line L1 (the third area 33A) is non-displayed on the instrument board 35 of the display device 30A, the driver can easily recognize that the hybrid vehicle 10 is traveling in the second mode (the traveling state of the hybrid vehicle 10).

As described above, according to the display device 30A, since the first display portion 36 that changes according to the traveling output (first output) in the first mode and the motor output (second output) in the second mode is displayed in the first area 31A including the third area 33A and the second display portion 37 that changes according to the traveling output (third output) in the second mode is displayed in the second area 32A, the driver can easily judge the traveling state of the hybrid vehicle 10 by grasping which of the first display portion 36 and the second display portion 37 is changed. Therefore, it becomes easy for the driver to realize intended driving by correctly grasping the traveling state of the hybrid vehicle 10.

What is claimed is:

1. A display device for a hybrid vehicle configured to display at least one of outputs related to traveling of the hybrid vehicle, the display device comprising:
   a first area configured to indicate a first output in a first mode in which traveling is performed with an electric motor while an internal combustion engine is stopped and to indicate a second output in a second mode in which traveling is performed with the internal combustion engine and the electric motor both being actuated;
   a second area provided side by side with the first area and configured to indicate a third output in the second mode; and
   a third area provided in a position adjacent to the second area, included in the first area, and configured to indicate a range of the first output where a possibility that the internal combustion engine starts is high,
   wherein the first area has a first display portion that changes according to the first output in the first mode and the second output in the second mode;
   wherein the second area has a second display portion that changes according to the third output in the second mode;
   wherein a display area formed of the first area and the second area is shaped in a circle;
   wherein the first area and the second area are provided so as to range with each other in a fan-like shape or an arc-like shape with an uppermost position of the display area as a boundary,
   wherein in the first mode, the first display portion changes in the first area and the second display portion does not change in the second area;
   wherein in the second mode, the first display portion changes in the first area and the second display portion changes in the second area;
   wherein the first area is in contact with the second area;
   wherein the third area included in the first area is in contact with the second area;
   wherein the third output is an output relating to only the internal combustion engine in the second mode; and
   wherein the second output is an output which is different from the third output in the second mode.

2. The display device according to claim 1,
   wherein the first display portion and the second display portion are provided respectively; and
   wherein in the first mode, the second display portion is fixed at a starting point, of the second area.

3. The display device according to claim 1,
   wherein a sectioning line indicating a starting point of the third area is provided in the first area; and
   wherein the sectioning line is non-displayed in the second mode.

4. The display device according to claim 3,
   wherein the sectioning line becomes non-displayed in response to a shift from the first mode to the second mode.

5. The display device according to claim 1,
   wherein the first mode and the second mode are shown in same display forms.

6. The display device according to claim 5,
   wherein the first display portion and the second display portion are needles.

7. The display device according to claim 1,
   wherein the first display portion and the second display portion are shown in different display forms.

8. The display device according to claim 1,
   wherein the first display portion is an image of a belt-like figure.

9. The display device according to claim 1,
   wherein the second display portion is a needle.

10. The display device according to claim 1,
    wherein the first output and the second output indicate the same output parameter.

11. The display device according to claim 1,
    wherein the second output indicates an output of the electric motor or an output of a battery connected to the electric motor; and
    wherein the first display portion changes according to the output of the electric motor or the output of the battery connected to the electric motor in the second mode.

12. The display device according to claim 1,
    wherein the second area indicates an engine speed of the internal combustion engine; and
    wherein the second display portion changes according to the engine speed of the internal combustion engine.

13. The display device according to claim 1,
    wherein the third area has a predetermined width which corresponds to the range of the first output where the possibility that the internal combustion engine starts is high.

14. The display device according to claim 1,
    wherein the third output is an output parameter of a rotation speed of the internal combustion engine in the second mode or an output parameter of a motive power by an actuation of the internal combustion engine in the second mode.

15. The display device according to claim 1,
    wherein the second output is an output relating to only the electric motor in the second mode or an output relating to only a battery connected to the electric motor in the second mode.

* * * * *